United States Patent
Doval

(10) Patent No.: US 11,878,350 B2
(45) Date of Patent: Jan. 23, 2024

(54) THREE-DIMENSIONAL PRINT ENGINE WITH LARGE AREA BUILD PLANE HAVING OPTIMIZED GAS FLOW DIRECTOR STRUCTURES

(71) Applicant: 3D Systems, Inc., Rock Hill, SC (US)

(72) Inventor: Jose Julio Doval, Escondido, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 310 days.

(21) Appl. No.: 17/487,211

(22) Filed: Sep. 28, 2021

(65) Prior Publication Data
US 2022/0105571 A1  Apr. 7, 2022

Related U.S. Application Data

(60) Provisional application No. 63/086,837, filed on Oct. 2, 2020.

(51) Int. Cl.
| | |
|---|---|
| B22F 12/70 | (2021.01) |
| B33Y 10/00 | (2015.01) |
| B33Y 30/00 | (2015.01) |
| B33Y 40/00 | (2020.01) |
| B23K 26/342 | (2014.01) |
| B22F 12/00 | (2021.01) |
| B22F 10/28 | (2021.01) |
| B23K 26/16 | (2006.01) |

(Continued)

(52) U.S. Cl.
CPC ............ B22F 12/70 (2021.01); B22F 10/28 (2021.01); B22F 12/38 (2021.01); B23K 26/16 (2013.01); B23K 26/342 (2015.10); B33Y 10/00 (2014.12); B33Y 30/00 (2014.12); B33Y 40/00 (2014.12); B23K 26/0604 (2013.01); B23K 26/083 (2013.01)

(58) Field of Classification Search
CPC ......... B33Y 10/00; B33Y 30/00; B33Y 40/00; B23K 26/342; B23K 26/16; B23K 26/0604; B23K 26/083; B22F 12/70; B22F 12/38; B22F 10/322; B22F 10/28
USPC ...................................................... 219/121.66
See application file for complete search history.

(56) References Cited

U.S. PATENT DOCUMENTS

| | | | |
|---|---|---|---|
| 2017/0036404 A1* | 2/2017 | Rengers ................ | B33Y 40/00 |
| 2017/0216916 A1* | 8/2017 | Nyrhilä ................ | B22F 10/322 |

(Continued)

FOREIGN PATENT DOCUMENTS

CN  106492603 A  * 3/2017

*Primary Examiner* — Janie M Loeppke
*Assistant Examiner* — Simpson A Chen

(57) ABSTRACT

A three-dimensional (3D) print engine includes (A) a plurality of walls laterally defining a build chamber, (B) a build box including a build plate, (C) a powder dispenser, (D) a beam system for fusing layers of powder, (E) a peripheral plate disposed between the build plate and the plurality of walls and having an upper surface, (F) a gas inlet that ejects a gas flow stream that passes over the build plate and the peripheral plate, (G) a gas outlet that receives the gas flow stream, (H) a plurality of projecting structures mounted to and extending above the upper surface of the peripheral plate, and (I) a gas handling system coupled to the gas inlet and gas outlet. The plurality of projecting structures shape the flow field of the gas flow stream to provide a more uniform velocity of gas flow velocities above the build plane.

18 Claims, 8 Drawing Sheets

(51) Int. Cl.
*B23K 26/06* (2014.01)
*B23K 26/08* (2014.01)

(56) References Cited

U.S. PATENT DOCUMENTS

2018/0200791 A1* 7/2018 Redding .............. B29C 64/153
2020/0078864 A1* 3/2020 Mehl .................... B29C 64/364

* cited by examiner

THREE-DIMENSIONAL PRINT ENGINE WITH LARGE AREA BUILD PLANE HAVING OPTIMIZED GAS FLOW DIRECTOR STRUCTURES

CROSS-REFERENCE TO RELATED APPLICATIONS

This non-provisional patent application claims priority to U.S. Provisional Application Ser. No. 63/086,837, Entitled "Three-Dimensional Print Engine with Large Area Build Plane Having Optimized Gas Flow Director Structures" by Jose Doval, filed on Oct. 2, 2020, incorporated herein by reference under the benefit of U.S.C. 119(e).

STATEMENT OF GOVERNMENT GRANT

This invention was made with government support under Agreement No. W911NF-18-9-000.3 awarded by the U.S. Army Research Laboratory and AMMP Consortium Member Agreement Number 201935 awarded by the National Center for Manufacturing Sciences (NCMS). The government has certain rights in the invention.

FIELD OF THE INVENTION

The present disclosure concerns an apparatus and method for a layer-by-layer fabrication of three dimensional (3D) articles by selectively fusing metal powder materials. More particularly, the present disclosure concerns a system and method that provides very large but high quality 3D articles.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered metallic materials. Each layer of powdered material is dispensed over a build plane and then selectively fused using an energy beam such as a laser, electron, or particle beam.

There is a desire to rapidly fabricate very large and defect-free 3D articles. Rapid fabrication of such large 3D articles requires multiple lasers working in parallel over a very large build plane. As a layer of powder is selectively fused, a "plume" cloud is generated as metal is vaporized. The plume cloud can partially block the energy beam or condensates from the cloud can obstruct the laser window and thereby cause variation in completeness of powder fusion. The result can be product defects.

A typical solution has been to pass an inert gas over the layer of powder to sweep away the plume. Over a very large build plane area this can produce variable results due to variations in gas flow velocity vectors over the build plane that either fail to remove the plume or that disturb powder particles. What is needed is a system to provide a required gas flow distribution to effectively remove the plume but without disturbing the powder particles.

SUMMARY

Figure 1:
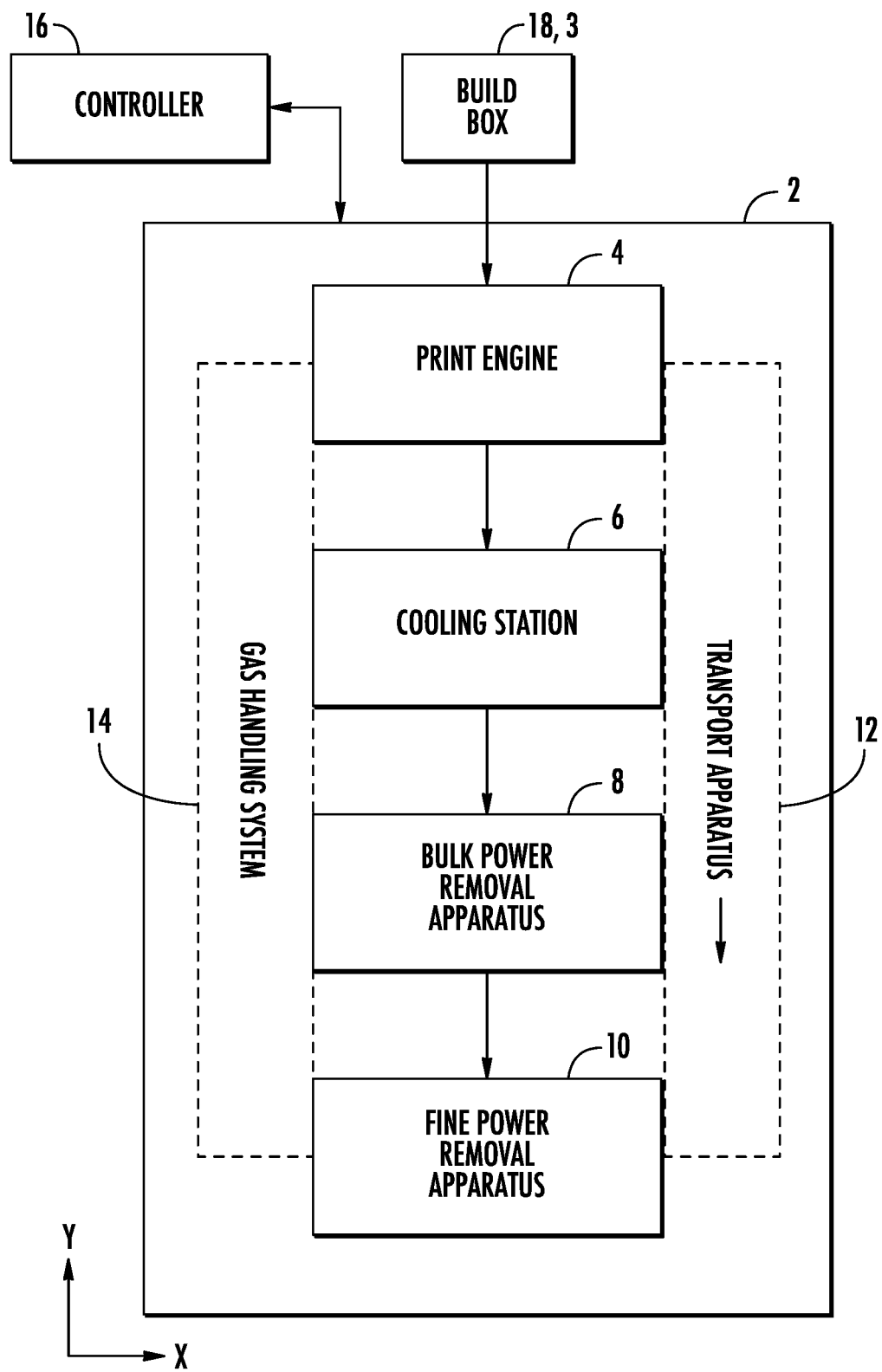
FIG. 1 is a schematic block diagram of an embodiment of an additive manufacturing system for producing a three-dimensional (3D) article.

In a first aspect of the disclosure, a three-dimensional (3D) print engine is for fabricating a 3D article and includes: (A) a plurality of walls laterally defining a build chamber, (B) a build box including a build plate coupled to a vertical positioning apparatus, the build plate defining a lateral area, (C) a powder dispenser, (D) a beam system configured to generate a plurality of energy beams that scan over a build plane within the lateral area of the build plate and that is generally at a fixed height for powder fusion, (E) a peripheral plate disposed between the build plate and the plurality of walls, the peripheral plate having an upper surface, (F) a gas inlet that ejects a gas flow stream at an inlet end of the build chamber and passes over the build plane and at least part of the upper surface of the peripheral plate, (G) a gas outlet at an outlet end of the build chamber and receives the gas flow stream from the gas inlet, (H) a plurality of projecting structures mounted to and extending above the upper surface of the peripheral plate, the plurality of projecting structures shape the flow field of the gas flow stream to provide a more uniform velocity of gas flow velocities above the build plane, (I) a gas handling system coupled to the gas inlet and gas outlet, and (J) a controller. The controller includes a processor coupled to a non-transient or non-volatile information storage device storing software instructions. By executing the software instructions, the controller is configured to: (1) operate the vertical positioning system to position the build plate for receiving a new layer of powder, (2) operate the powder dispenser to dispense the new layer of powder over the build plate or a previously dispensed layer of powder, the new layer of powder having an upper surface proximate to the build plane, (3) operate the gas handling system to provide the gas flow stream, (4) operate the beam system to selectively fuse the layer of powder dispensed by the powder dispenser, and repeat steps (1)-(4) to complete fabrication of the 3D article.

The improved uniformity of the gas flow velocities enables an effective removal of a plume without disturbing metal particles over a larger build plane than was possible before. This enables build planes that are at least 0.5 square meter, at least 0.7 square meter, or about one square meter with uniformly defect-free results even when the beam system utilizes multiple energy beams concurrently. The beam system can utilize 5 or more, 7 or more, or 9 or more energy beams concurrently for selectively fusing a layer of the metal powder. In the illustrated embodiment, the beam impingement on the build plane is staggered with respect to Y to minimize interference of a plume with one laser with respect to another laser. In this illustrative embodiment, for a system with 9 lasers, 2 or 3 of the lasers are inactive to reduce plume generation and interference.

For the following implementations there are three mutually perpendicular axes used including lateral axes X and Y and vertical axis Z. The lateral axes are generally horizontal and the vertical axis Z is generally aligned with a gravitational axis. Between the gas inlet and the gas outlet, gas flow stream generally has a velocity in the +X direction. While that is generally true on average (average velocity is predominantly in the +X direction) there can be localized flow patterns that vary due to laminar flow patterns, turbulent flow patterns, and/or vortices in the flow. The direction Y is referred to as a cross-flow direction. While Y may be perpendicular to the general flow direction and velocity of the gas flow stream, there may be localized flows due to localized geometry, turbulence, or lack of entrainment that produces Y components.

In one implementation, the peripheral plate laterally surrounds the build plate. The upper surface of the peripheral plate can be generally parallel or coplanar with build plane. The upper surface of the peripheral plate can include or be divided into different surfaces or sections including an inlet surface, a middle surface, and an outlet surface. (1) The inlet surface is laterally disposed with respect to X between the build plate and the gas inlet. The plurality of projecting structures can include one or two diverters and an array of fins that project upwardly from the inlet surface. (2) The two middle surfaces are between lateral side walls and the build plane and overlap with the build plane with respect to X. The two middle surfaces are between the inlet surface and the outlet surface. The plurality of projecting structures can include a plurality or two arrays of fins that project upwardly from the middle surfaces. (3) An outlet surface that is laterally disposed with respect to X between the build plate and the gas outlet. The plurality of projecting structures can include one or two dams that project upwardly from the outlet surface.

In another implementation, the projecting structures include one or more of diverters, fins, and dams. The projecting structures have a minor axis that defines a thickness. The thickness is generally defined laterally. The projecting structures can have an intermediate vertical axis, and a major lateral axis. For the diverters, the major axis is either aligned or defines an acute angle with respect to X. The minor axis (thickness) is generally defined predominantly along Y. For the fins, the major axis is generally aligned with or defines an acute angle with respect to X. As with the diverters, the minor axis (thickness) is generally defined predominantly along Y. For the dams, the major axis is either aligned with or defines an acute angle with respect to Y. The minor axis (thickness) is generally defined predominantly along X.

In yet another implementation, the projecting structures extend a distance H above the upper surface of the peripheral plate. As the gas stream passes over the upper surface of the peripheral plate and the build plane a boundary layer is defined as a height h of the gas stream whose velocity profile is influenced by the upper surface of the peripheral plate. Preferably, H is at least equal to h or H is greater than h in order to maximize the influence of the projecting structures. In an illustrative embodiment H is between 10 and 15 millimeters or about 13 millimeters.

In a further implementation the gas inlet includes an outlet snout having two rows of nozzles including a lower row of nozzles and an upper row of nozzles. The lower row of nozzles emits gas at a first velocity V1 and the upper row of nozzles emit gas at a second velocity V2. The second velocity V2 is greater than the first velocity V1. The higher velocity flow from the upper row of nozzles entrains a flow of a lower gas stream from the lower array of nozzles to maintain the lower gas stream flow over the build plane. In an idealized model, the lower gas stream flows along the +X direction in close proximity to the build plane from the gas inlet to the gas inlet. In reality, there are localized velocity components that may vary over the entire flow path that may include Y and Z components.

In a yet further implementation the plurality of projecting structures includes a plurality of fins. The fins can have a defined shape as projected along a vertical plane parallel to X. The defined shape can include one or more of a triangle, a rectangle, a parallelogram, a trapezoid, a polygon, an irregular shape, or a shape having a curved edge.

In another implementation the plurality of projecting structures includes a plurality of fins. One or more of the fins can extend upwardly from the surface of the upper surface of the peripheral plate by a height H measured along Z. The height H is sufficient for the fin to extend completely through a boundary layer of the gas flow over the upper surface of the peripheral plate.

In a yet another implementation, the plurality of projecting structures includes a plurality of vertical fins. The vertical fins can have a triangular shape with three edges including a lateral edge at the upper surface of the peripheral plate. The triangular shape also has a leading edge and a trailing edge with respect the X-axis. The trailing edge is the shortest edge of the triangle. The leading edge can define an acute angle with respect to X and the trailing edge can be nearly vertical. The plurality of vertical fins can include pairs of vertical fins individually having two fins that define opposing acute angles with respect to X. More specifically, the lateral edges of a pair of fins define opposing acute angles with respect to X. In a particular embodiment, a fin has a height H which is in a range of about 10 to 15 millimeters or about 13 millimeters although other values of H are possible. A length of a lateral edge can be about two times H. When the fin defines a right triangle, the trailing edge can have a length of H and the lateral edge can have a length of about 2H.

In a further implementation, the upper surface of the peripheral plate can include a rectangular inlet surface laterally disposed between the build plate and the gas inlet. The plurality of projecting structures can include at least one diverter wall. The diverter wall can include a first diverter wall having a major lateral axis that defines an acute angle with respect to the X-axis. The diverter wall can include a second diverter wall having a long axis that is substantially parallel to the X-axis. The diverter wall can include two diverter walls including the first diverter wall and the second diverter wall that are laterally spaced apart with respect to Y and are approximately laterally aligned with opposing edges of the build plane that are parallel to X. The diverter wall is vertical and has a height H. Height H can be within a range of about 10 to 15 millimeters or about 13 millimeters.

In a yet further implementation, the upper surface of the build plate includes an outlet surface which is laterally disposed between the build plate and the gas outlet. The plurality of projecting structures include a dam wall. The dam wall has a major axis that is generally parallel to Y. The dam wall can include two aligned dam walls that have a gap therebetween that overlaps the build plane with respect to the Y-axis. The dam two aligned dam walls includes a first dam wall and a second dam wall. The first dam wall can be longer than the second dam wall so that a gap between the first and second dam walls is not centered with respect to the Y-axis.

In another implementation, the powder dispenser includes a wall portion that forms a portion of the plurality of walls that laterally define the build chamber when the powder dispenser is in a docked position.

DETAILED DESCRIPTION OF THE PREFERRED EMBODIMENTS

FIG. 1 is a schematic block diagram of an embodiment of an additive manufacturing (AM) system 2 for producing a three-dimensional (3D) article 3. AM system 2 includes a print engine 4, a cooling station 6, a bulk powder removal apparatus 8, a fine powder removal apparatus 10, a transport apparatus 12, a gas handling system 14, and a controller 16. The various components 4-14 can individually have separate "lower level" controllers for controlling their internal functions. In some embodiments, a controller can function as a central controller. In the following description, controller 16 will be considered to include all controllers that may reside externally or within the components 4-14. Controller 16 can be internal to AM system 2, external to AM system 2, or include portions that are both internal and external to AM system 2.

The transport apparatus 12 is for transporting a build box 18 through the various components 4-10 in a sequence that includes fabricating, cooling, and de-powdering a 3D article 3 being manufactured. The gas handling system 14 is for controlling an environment for components 4-10. In one embodiment, the gas handling system is configured to evacuate components 4-10 and then to backfill them with a non-oxidizing gas such as argon or nitrogen in order to maintain the build box 18 within a non-oxidizing environment. In some embodiments, the gas handling system 14 can be several systems that are individually dedicated to individual components of the components 4-10. In an illustrative embodiment, the print engine 4 is evacuated and backfilled with gas while the components 6-10 are not evacuated but are purged with a non-oxidizing gas. Yet other variations of gas handling system 14 are possible.

Controller 16 includes a processor coupled to a non-transient or non-volatile information storage device which stores software instructions. When executed by the processor, the software instructions operate any or all portions of the system 2. In an illustrative embodiment, fabrication, cooling, de-powdering, and other functions can be performed in a fully automated way by controller 16.

Controller 16 is configured to perform steps such as (1) operate gas handling system 14 to evacuate and/or backfill components 4-10, (2) operate print engine 4 to fabricate a 3D article in build box 18, (3) operate transport apparatus 12 to transport build box 18 (which now contains the 3D article and unfused powder) to the cooling station 6, (4) after an appropriate cooling time, operate transport apparatus 12 to transport build box 18 to bulk powder removal apparatus 8, (5) operate bulk powder removal apparatus 8 to remove most of the unfused powder from the build box 18, and (6) operate transport apparatus 12 to transport the build box 18 to the fine powder removal apparatus 10. At the fine powder removal apparatus 10, residual unfused powder is removed either automatically or manually. All the while, controller 16 operates the gas handling system 14 to maintain a non-oxidizing gaseous environment within the components 4-10 as required.

AM system 2 can have other components such as an inspection station or a station for facilitating unloading of the 3D article 100 from the build box 18. The additional components can be manually operated or within the control of controller 16.

Figure 2:
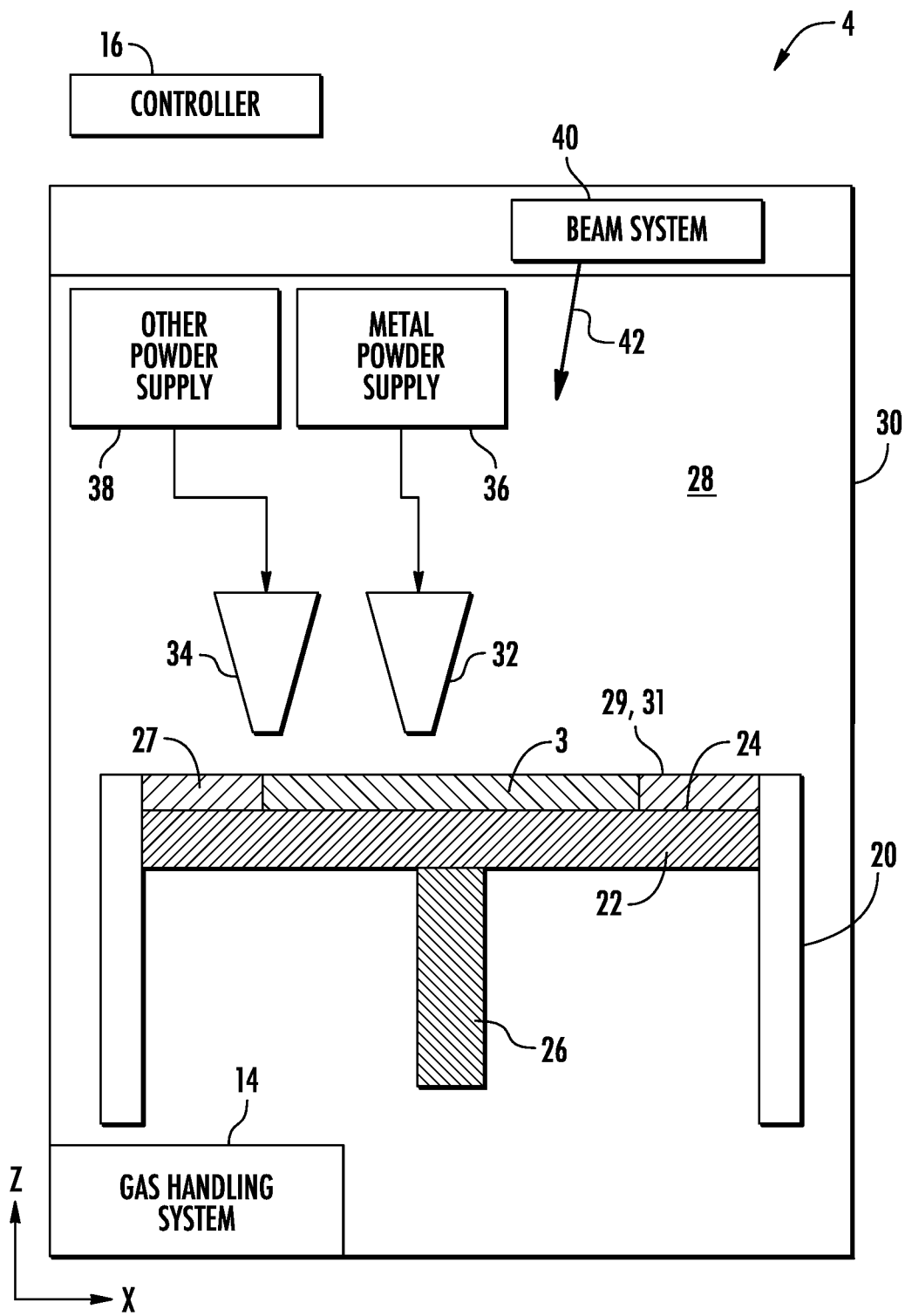
FIG. 2 is a schematic diagram of a 3D print engine. In the illustrated embodiment, the 3D print engine fabricates a 3D article through a layer by layer fusion melting of metal powder layers.

FIG. 2 is a schematic diagram of an embodiment of a 3D print engine 4 for fabricating a 3D article 3. In describing FIG. 2 and for subsequent figures, mutually orthogonal axes X, Y, and Z can be used. Axes X and Y are lateral axes that are generally horizontal. Axis Z is a vertical axis that is generally aligned with a gravitational reference. By "generally" it is intended to be so by design but may vary due to manufacturing or other tolerances.

The build box 18 (FIG. 1) includes a powder bin 20 containing a build plate 22. Build plate 22 has an upper surface 24 and is mechanically coupled to a vertical positioning system 26. The build box 18 is configured to contain dispensed metal powder 27. The build box 18 is contained within chamber 28 surrounded by housing or chassis 30.

The vertical positioning system 26 is configured to position the upper surface 24 under control of controller 16. In an illustrative embodiment, the vertical positioning system 26 includes a lead screw coupled to a vertically fixed nut. The nut is coupled to a motor. As the nut is rotated by the motor, inside threads of the nut engage outer threads of the lead screw, causing a tip of the lead screw to either lift or lower the build plate 22. Of course, this is but one example of a vertical positioning system. In another example, the lead screw can be fixed vertically and a nut can rise and fall under a motorized turning of the lead screw. The nut can be coupled to a lever or a vertical follower rod that is in turn mechanically coupled to the build plate 22. The motorized rotation of the lead screw would then cause the lever or follower rod to raise and lower the build plate 22. Other examples are possible for vertical positioning system 26.

A metal powder dispenser 32 is configured to dispense layers of metal powder 27 upon the upper surface 24 of the build plate 22 or on previously dispensed layers of metal powder 27. When a layer of powder 27 is just dispensed, it has an upper surface 29 that is preferably coincident or coplanar with a build plane 31. In some operational implementations, the upper surface 29 may be positioned slightly below build plane 31.

In the illustrated embodiment, a second powder dispenser 34 is configured to dispense an additional powder. Powder dispensers 32 and 34 are configured to receive powder from powder supplies 36 and 38 respectively. The additional powder may be a different metal powder, the same metal powder, or a support material. The print engine 4 can include more than two powder dispensers to allow multiple different materials to be dispensed.

Print engine 4 includes a beam system 40 configured to generate an energy beam 42 for selectively fusing layers of dispensed metal powder. In an illustrative embodiment, the beam system 40 includes a plurality of high power lasers for generating radiation beams individually having an optical power of at least 100 watts, at least 500 watts, about 1000 watts, at least 1000 watts, or another optical power level. The beam system 40 can include optics for individually steering the radiation beams across the build plane 31 that is generally coincident with the upper surface 29 the metal powder 27 layer. In alternative embodiments, the beam system 40 can generate electron beams, particle beams, or a hybrid mixture of different beam types.

The build plane 31 is defined laterally by a maximum lateral area that is addressable by the beam system 40 and is defined vertically by a focus of the beam system 40. The maximum lateral area may be limited by software and/or hardware limits. The lateral area of the build plane 31 is within the lateral area of the build plate 22. Preferably there is a laterally defined boundary region between the build plate 31 and the powder bin 20 to facilitate removal of unfused powder 27.

In an illustrative embodiment, the build plane 31 has a lateral area that is at least about 0.5 square meters or at least about 0.7 square meters. Larger areas are possible. In the illustrated disclosure, the build plane 31 has an area of about one square meter and the print engine 4 can process up to four tons or more of metal during a build process. This is a uniquely large area for selectively dispensing and fusing metal powders.

Figure 3:
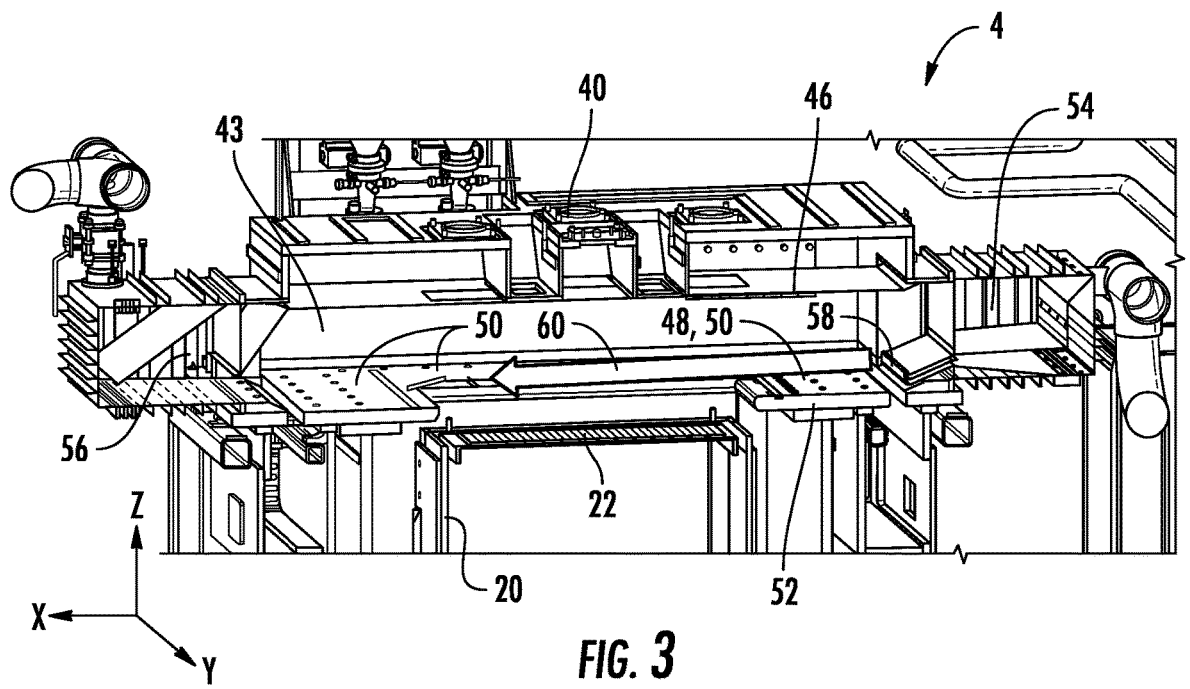
FIG. 3 is an isometric cutaway view of a portion of a 3D print engine.

FIG. 3 is an isometric cutaway view of a portion of an embodiment of print engine 4. Within chamber 28 (FIG. 2) is a build chamber 43. Build chamber 43 has a generally parallelepiped geometry that is enclosed by a plurality of bounding walls 44 that laterally define the build chamber 43, an upper ceiling 46, and a floor 48 (see also FIG. 4). Walls 44 and ceiling 46 are generally smooth surfaces so as to avoid adverse effects on gas flow and can be formed from various materials such as metal and glass.

Above the ceiling 46 is the beam system 40. In the illustrated embodiment, the beam system 40 includes an array of nine high powered lasers that individually emit a radiative power of about 1000 watts.

The floor 48 is defined by the build plane 31 and an upper surface 50 of a peripheral plate 52 that is laterally disposed between the build plate 22 and the walls 44. The upper surface 50 is generally parallel or coplanar with the build plane 31. In the illustrated embodiment, the upper surface 50 laterally surrounds the build plate 22 on all four sides.

The gas handling system 14 (FIG. 2) is coupled to a gas inlet 54 and a gas outlet 56. The gas inlet 54 has a snout 58 that emits a sheet-like gas stream 60 that passes from the gas inlet 54 to the gas outlet 56 along a lateral axis X. The gas stream 60 functions to entrain and extract fumes generated as a result of energy beams 42 impinging upon and melting the powder 27. The velocity of the gas stream 60 immediately above the build plane 31 needs to be controlled. If the velocity is too high, the gas stream 60 may entrain particles of the powder 27 which is undesirable. If the velocity is too low, the plume may not be sufficiently removed. The smooth walls 44 and ceiling 46 and the general parallelepiped geometry of the build chamber 43 facilitate a more uniform velocity profile. As will be seen, other features also improve the velocity profile.

Figure 4:
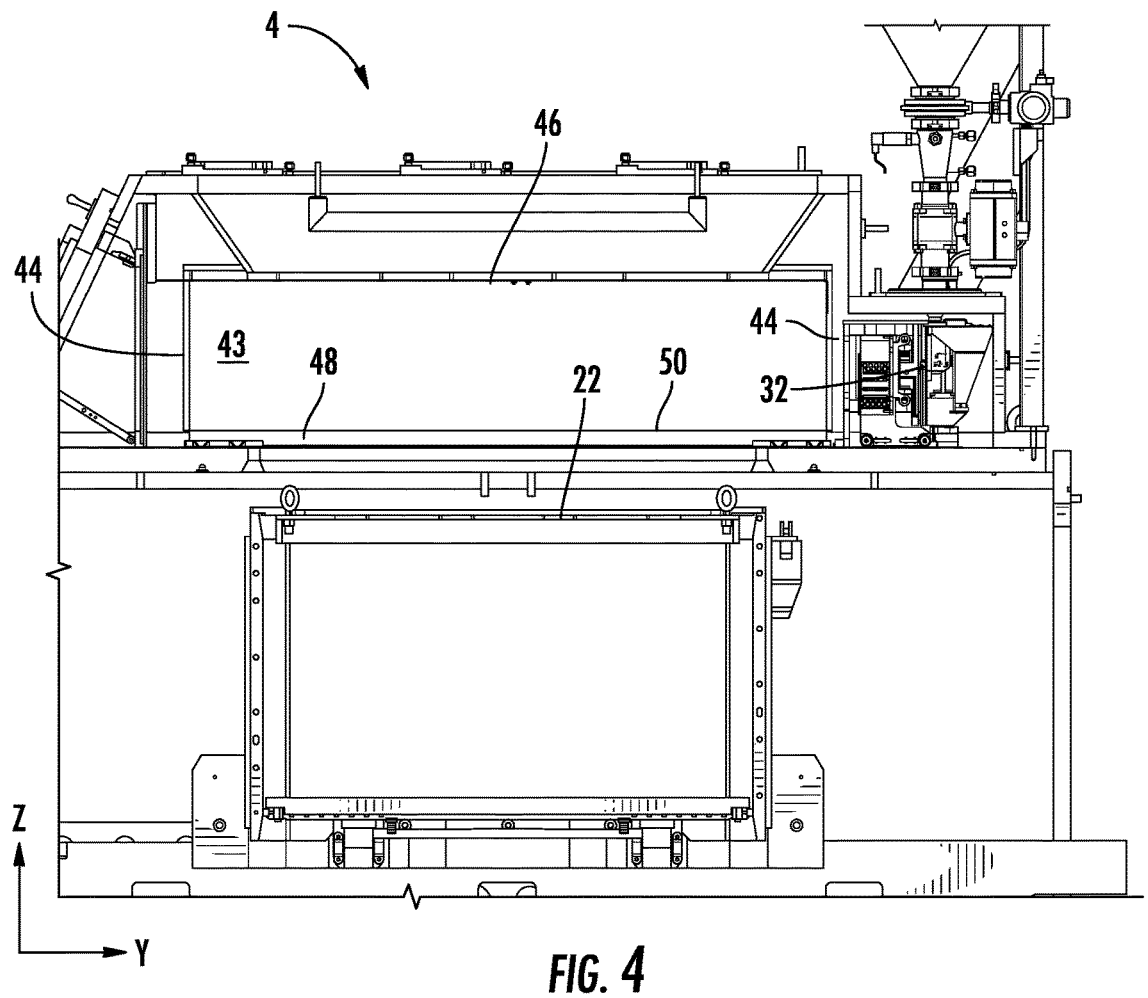
FIG. 4 is a side cutaway view of a portion of a 3D print engine.

FIG. 4 is a side cutaway view of print engine 4. The cut is along the YZ-plane which is generally perpendicular to the general movement of gas stream 60. Gas stream 60 may have vortices and other velocity variations that are not exactly parallel to X. Also shown is a metal powder dispenser 32. In the illustrated position and configuration, the powder dispensing apparatus 32 is in a "parked" configuration and position behind lateral wall 44.

Figure 5:
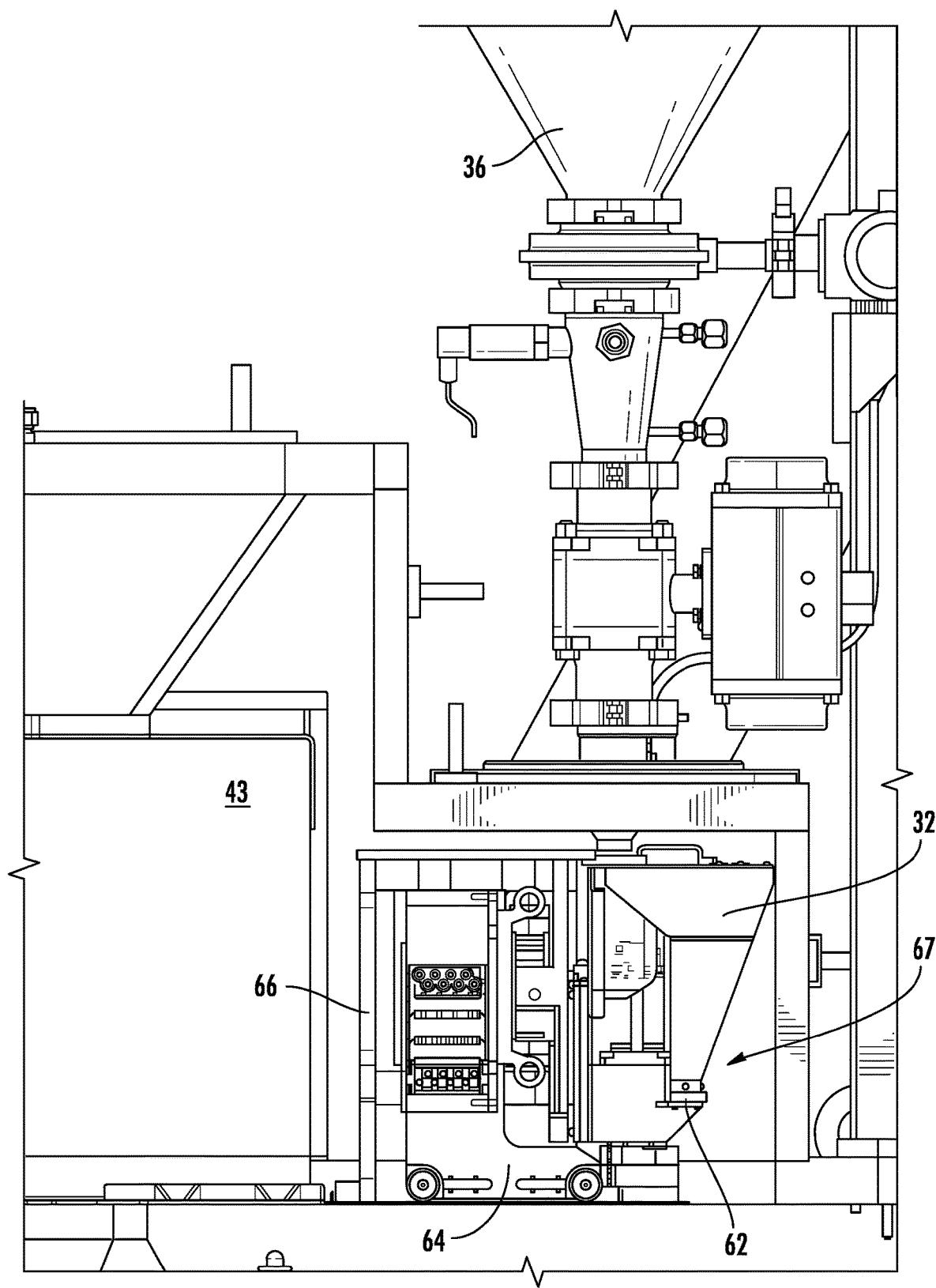
FIG. 5 is a side cutaway view that is a portion of the view of FIG. 4.

FIG. 5 is detail taken from FIG. 4 to better illustrate the dispenser 32. The dispenser 32 includes dispensing tip 62, gantry 64, and a wall portion 66. In the illustrated parked position the dispenser 32 is being filled with metal powder 27 from powder supply 36. During fabrication, while gas flow stream 60 is flowing and while the beam system 40 is operating the wall portion 66 is positioned to form a portion of a lateral wall 44 (FIG. 4). When the wall portion 66 forms part of lateral wall 44, the dispenser 32 is located in a "dock" 67. During dispensing of the powder 27, the gantry 66 moves the nozzle tip 62 over the build plate 22. After a new layer of powder 27 is dispensed, the dispenser 32 moves back to dock 67 and again the wall portion 66 forms a part of lateral wall 44.

Figure 6:
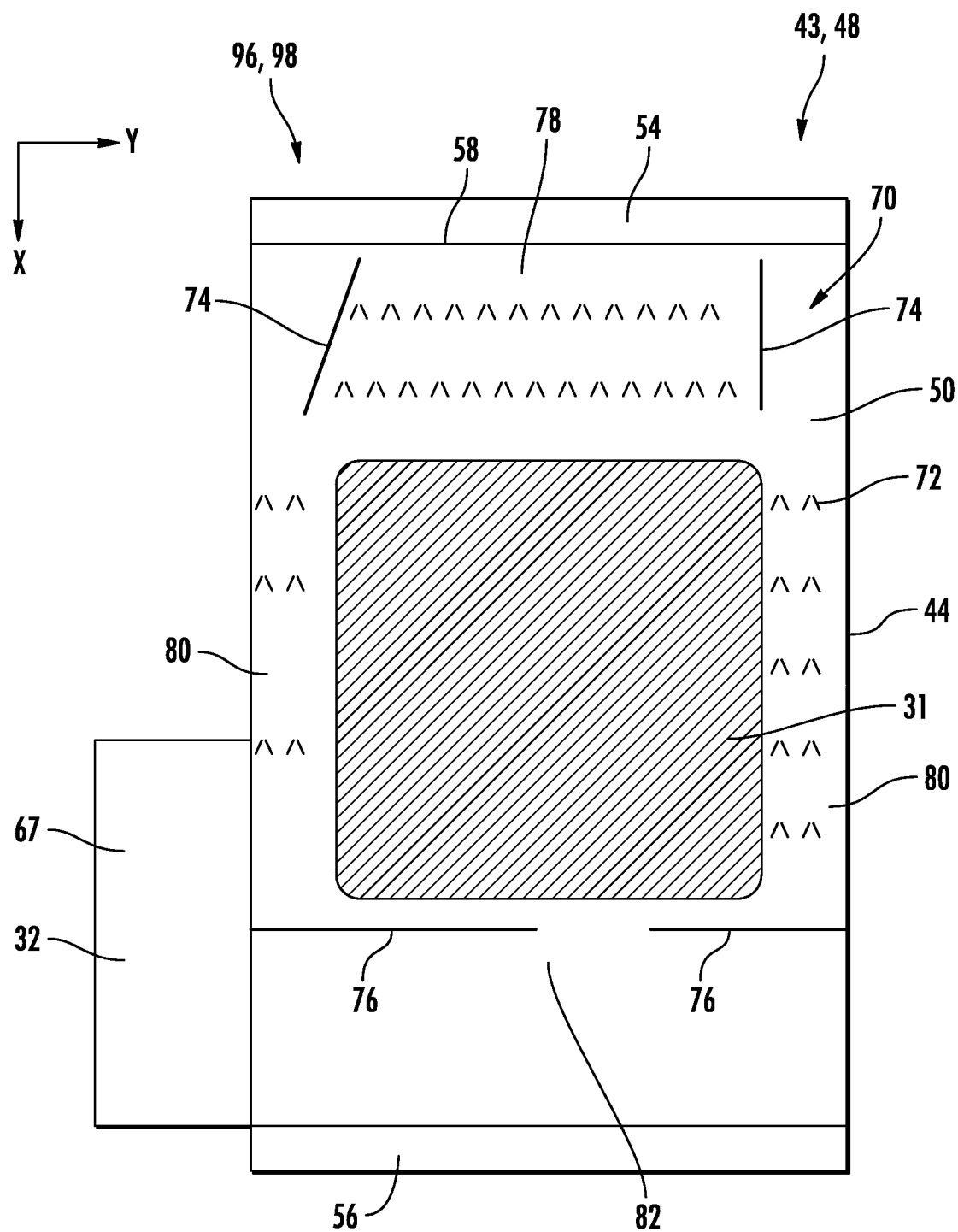
FIG. 6 is a schematic plan view of a build chamber.

FIG. 6 is a schematic view of the build chamber 43 looking down on floor 48. The gas flow stream 60 (FIG. 3) generally flows along the lateral +X direction from the gas inlet 54 to the gas outlet 56. But that is generally an "average flow vector" direction X. At any position in the build chamber 43, a localized flow vector can have vector directions that have components in Y and Z. The localized flow vectors may even have −X components of turbulent flow. A vector "flow field" can be defined, which defines a magnitude and direction of a gas flow velocity at individual locations within the build chamber 43. The average flow can also have components of Y or Z based upon the exact geometry of the gas inlet 54 and gas outlet 56, but the predominant average flow direction is +X. For this reason, Y can be referred to as a lateral transverse or cross-flow direction and Z can be referred to as a vertical cross-flow direction.

A boundary layer of gas flows directly over the surface 50. The boundary layer is defined as a portion of the flowing gas that is a layer of gas whose vector flow field is directly influenced by the surface 50. Above the boundary layer, there is preferably laminar flow but there may be some turbulence and swirling gas.

An important aspect of the gas flow is the boundary layer that is directly over the build plane 31 over which the beam system 40 operates. Ideally the gas flow velocity would be controllable and uniform over the build plane 31. However, in practice, there is variation. The gas flow velocity will tend to decrease along X for a given Y value. The gas flow velocity will also tend to vary along Y with higher velocities toward the center of the flow stream with respect to Y.

To improve uniformity of the gas flow velocity along build plane 31, an innovative combination of gas flow director structures 98 have been implemented. Gas flow director structures 98 include the snout 58 design as well as a plurality of projecting structures 70. The projecting structures 70 generally project up from surface 50. Ideally the projecting structures 70 vertically project above surface 50 and exceed the height of the boundary layer in order to have a maximal effect. The effect of the snout 58 design and projecting structures 70 is to shape the flow field of gas to provide a much more uniform velocity across the build plane 31 that would otherwise be possible.

In an illustrative embodiment projecting structures 70 project vertically from surface 50 and are all about 13 millimeters in height H. However, in different embodiments, projecting structures can vary in height from about 10 millimeters to about 20 millimeters in height or can have heights that are less than 10 millimeters or more than 20 millimeters. In the illustrated embodiment of print engine 4, the value of height H can vary from about 10 to 15 millimeters to have a significant effect and to avoid interfering with motion of the powder dispenser 32. But other designs may afford a greater range of H. As for controlling the gas flow optimally, H is greater than the height of the boundary layer above surface 50.

The illustrated embodiment, projecting structures 70 include pairs of fins 72, diverters 74, and dam walls 76. The surface 50 includes an inlet surface 78 that is a rectangular portion of surface 50 which is laterally located between the snout 58 and the build plane 31 with respect to X. The diverters 74 and an array of the fins 72 are disposed on the inlet surface 78. Surface 50 includes two rectangular middle surfaces 80 that are between lateral walls 44 and the build plane 31. The middle surfaces 80 overlap with the build plane 31 with respect to X. Some of the fins 72 are disposed upon the middle surfaces 80. Finally, surface 50 includes an outlet surface 82 that is laterally between the build plane 31 and outlet 56 with respect to X. The dam walls 76 are located on the outlet surface 82. The projecting structures 70 will be described in more detail infra.

Figure 7:
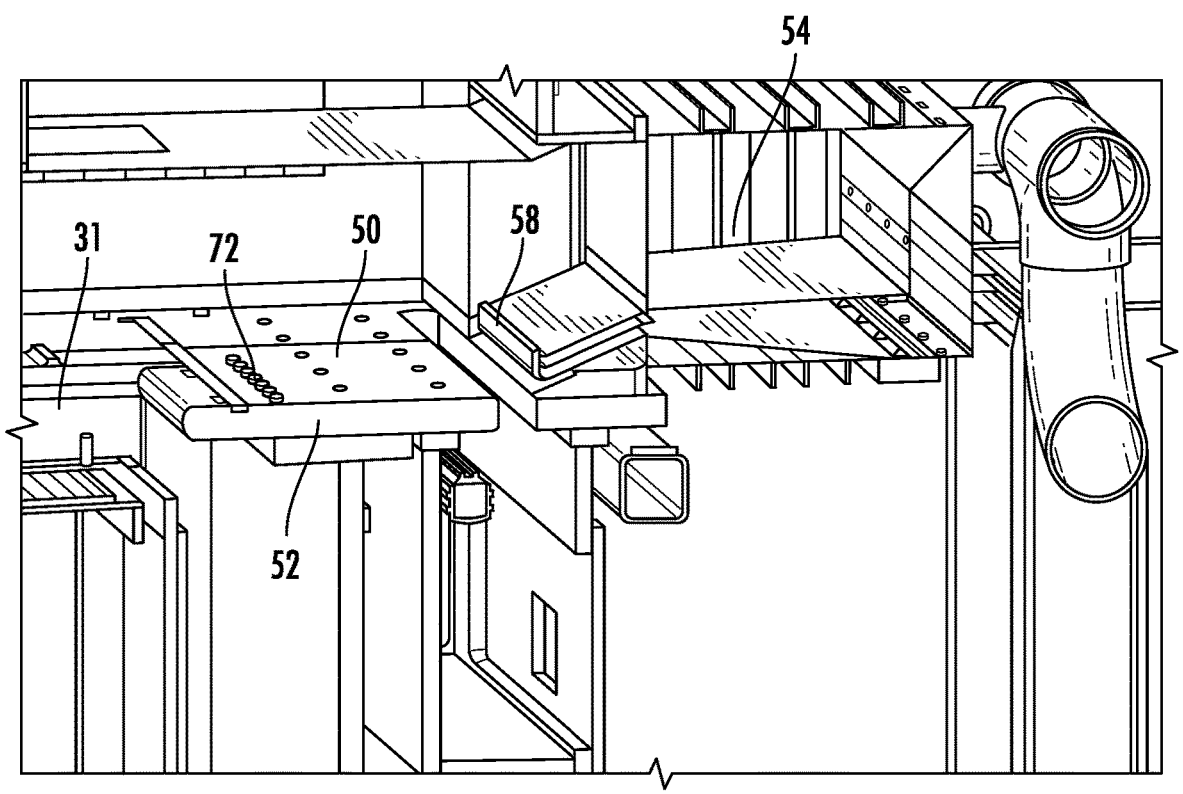
FIG. 7 is an isometric cutaway view of a portion of a 3D print engine and is a portion of FIG. 3.
Figure 8:
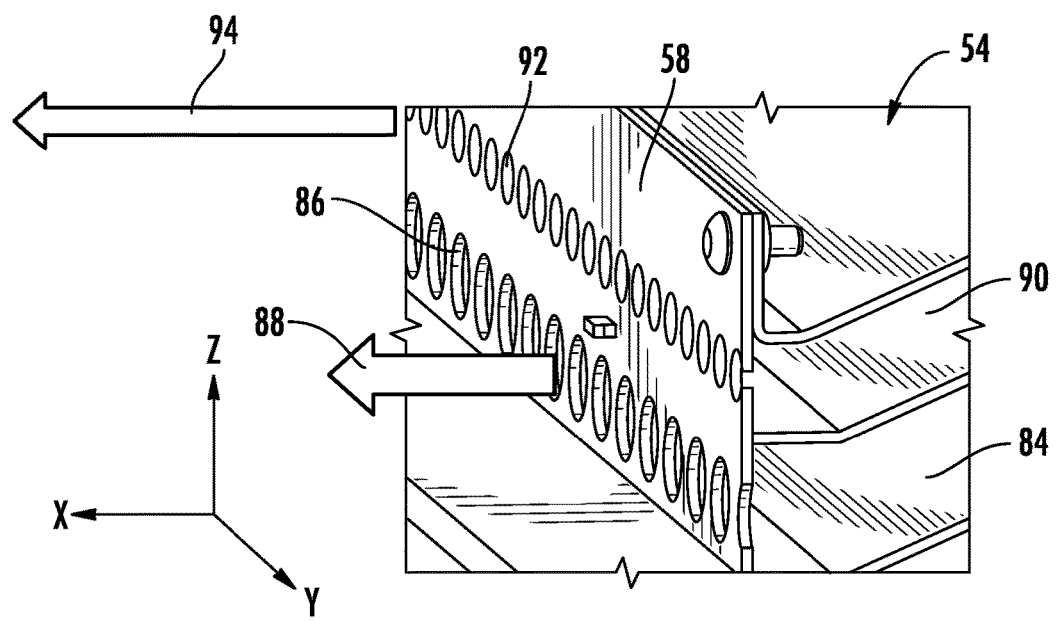
FIG. 8 is a first detail view of a portion of FIG. 7.

FIG. 7 is detail taken from FIG. 3 illustrating some of the flow director structures 98 from gas inlet 54 to the build plane 31 including the snout 58 and the fins 72. FIG. 8 is detail taken from FIG. 7 focusing on a portion of the gas inlet 54 and snout 58. The gas inlet 54 includes a lower manifold 84 coupled to a lower array of nozzles or orifices or openings 86 formed into snout 58. Nozzles 86 have a first diameter D1 emitting a lower gas stream 88 with a first velocity V1 that travels close to the surface 50 and build plane 31. The gas inlet 54 includes an upper manifold 90 coupled to an upper array of nozzles or orifices or openings 92. Nozzles 92 have a second diameter D2 emitting an upper gas stream 94 with a second velocity V2 which is greater than V1. Having the gas stream 94 with the higher velocity V2 helps to entrain and maintain a flow of the lower gas stream 88 over the surface 50 and the build plane 31. In the illustrated embodiment, D1 is about 11 millimeters and D2 is about 7 millimeters. More generally, D1>D2.

In the illustrated embodiment, the nozzles 86 have a center to center spacing of 16 millimeters and centers that are 31.5 millimeters above the build plane 31 and the surface 50. The nozzles 92 have center to center spacing of 11 millimeters and centers that are 49.5 millimeters above the build plane 31 and the surface 50. The nozzles 86 and 92 span nearly the entire width of the build chamber 43 along the lateral axis Y.

Figure 9:
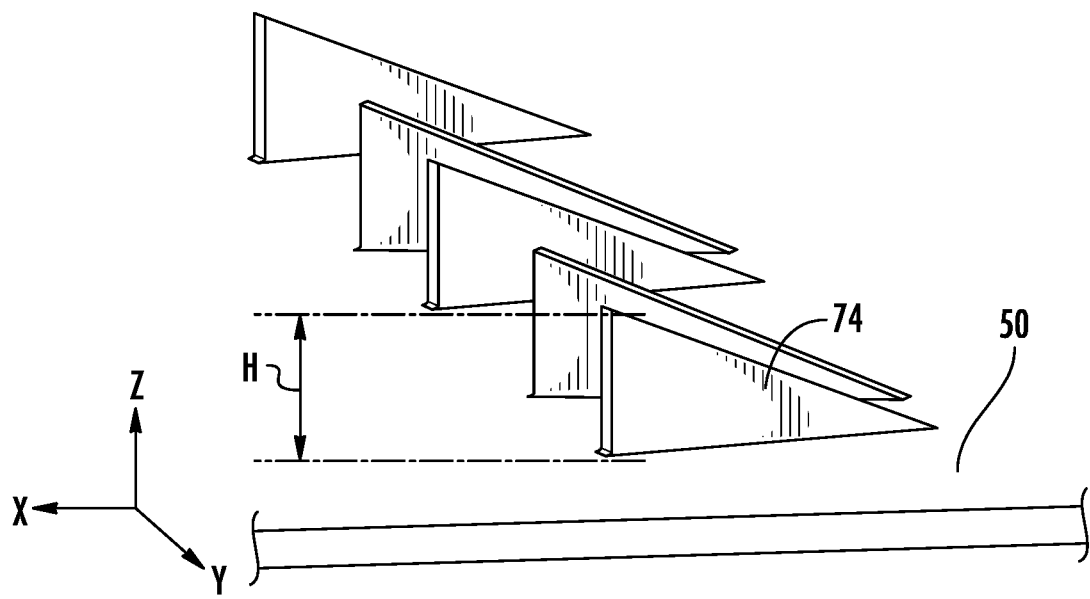
FIG. 9 is second detail view of a portion of FIG. 7.

FIG. 9 is detail taken from FIG. 7 illustrating some of the fins 72. In the illustrated embodiment, the fins 72 project vertically from surface 50 and have a vertical shape of a right triangle. The smaller base of the right triangle is vertical and has a height H. The larger base of the right triangle is lateral and has a length of 2H. The larger base of the right triangle defines an angle of 18 degrees with X.

Other fin shapes are possible. Fins 72 can have other shapes such as non-right triangles, rectangles, parallelograms, trapezoids, squares, other polygonal shapes, or shapes with curved edges while still providing a degree of control for the velocity flow field of the boundary layer directly above build plane 31. Generally speaking, the height H is taken to be the extent to which a fin extends above surface 50. Preferably H is greater than a height of the boundary layer to provide better control of the boundary layer flow field.

Figure 10:
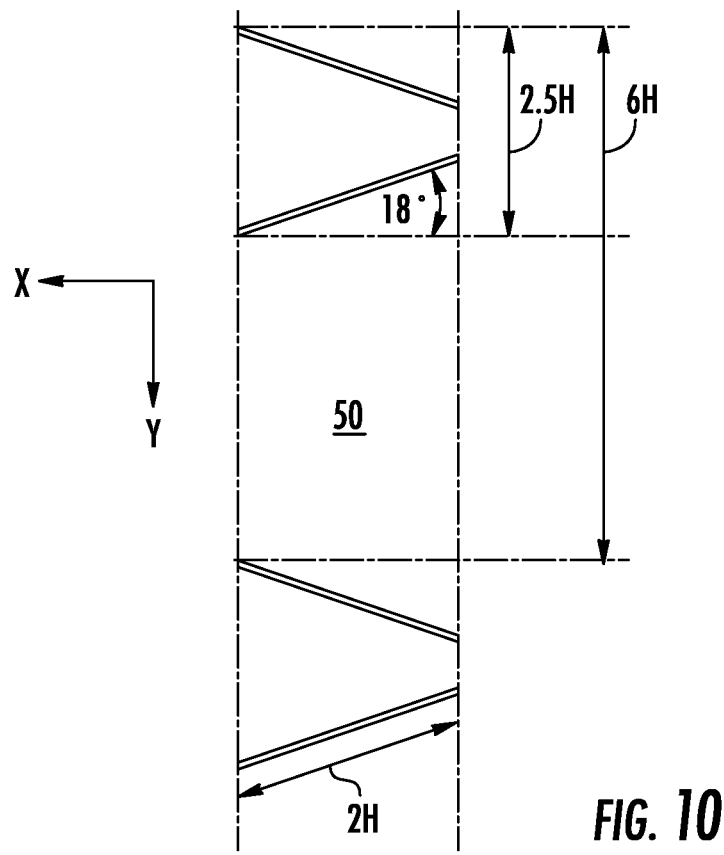
FIG. 10 is a top view of two pairs of fins.

FIG. 10 is a top view of an illustrative embodiment of two pairs of the fins 74 (not to scale). For a given pair of fins, the fins laterally diverge along X. At the leeward edges of the pair of fins, they are 2.5H apart. Arrayed pairs of fins are spaced at a pitch of 6H along Y.

In this illustrative example, the diverters 74 and the dams 76 are vertical walls extending the height H above the surface 50. The diverters 74 include one diverter that defines an acute angle with respect to the axis X and another diverter 74 that is very nearly parallel to X. The diverters help to maintain a velocity of the boundary layer along the aft (larger X) part of build plane 31 and at the edges of the build plane with respect to Y.

The dams 76 include one longer and one shorter dam that don't fully cross the build chamber along Y. In corner parts of the build chamber 43 over outlet surface 82 are laterally defined vortexes which can extend up toward the build plane 31 and slow down the boundary layer gas flow. The dams 76 block those vortices and assure a higher velocity along X at the aft (higher X portion) corners of the build plane 31.

This arrangement of the projecting structures 70 across the surface 50 has been found to be optimal for providing a most uniform flow field of velocities proximate to the build plane. This allows a velocity to be maximized in all areas of the build plane to effectively remove the plume without disturbing the metal powder 27 particles. An optimum average velocity is a function of the density and particle size of the metal powder 27 particles.

In summary, what has been described is a complete gas flow control architecture 96 (FIG. 6) that is configured to optimize a boundary layer gas stream 60 flow above the build plane 31 with as uniform of a flow velocity along X as possible. The flow director structures 98 include the generally duct-like rectangular chamber 48 from gas inlet 54 to gas outlet 56, the gas inlet 54 snout 58 with the lower and upper rows of nozzles (86 and 92 respectively) with lower and upper velocities (V1, V2, respectively, V2>V1), the inlet surface 78 with diverter walls 78 and fins 72, the middle regions 80 with fins 72, and the outlet surface 82 with dams 76.

Figure 11:
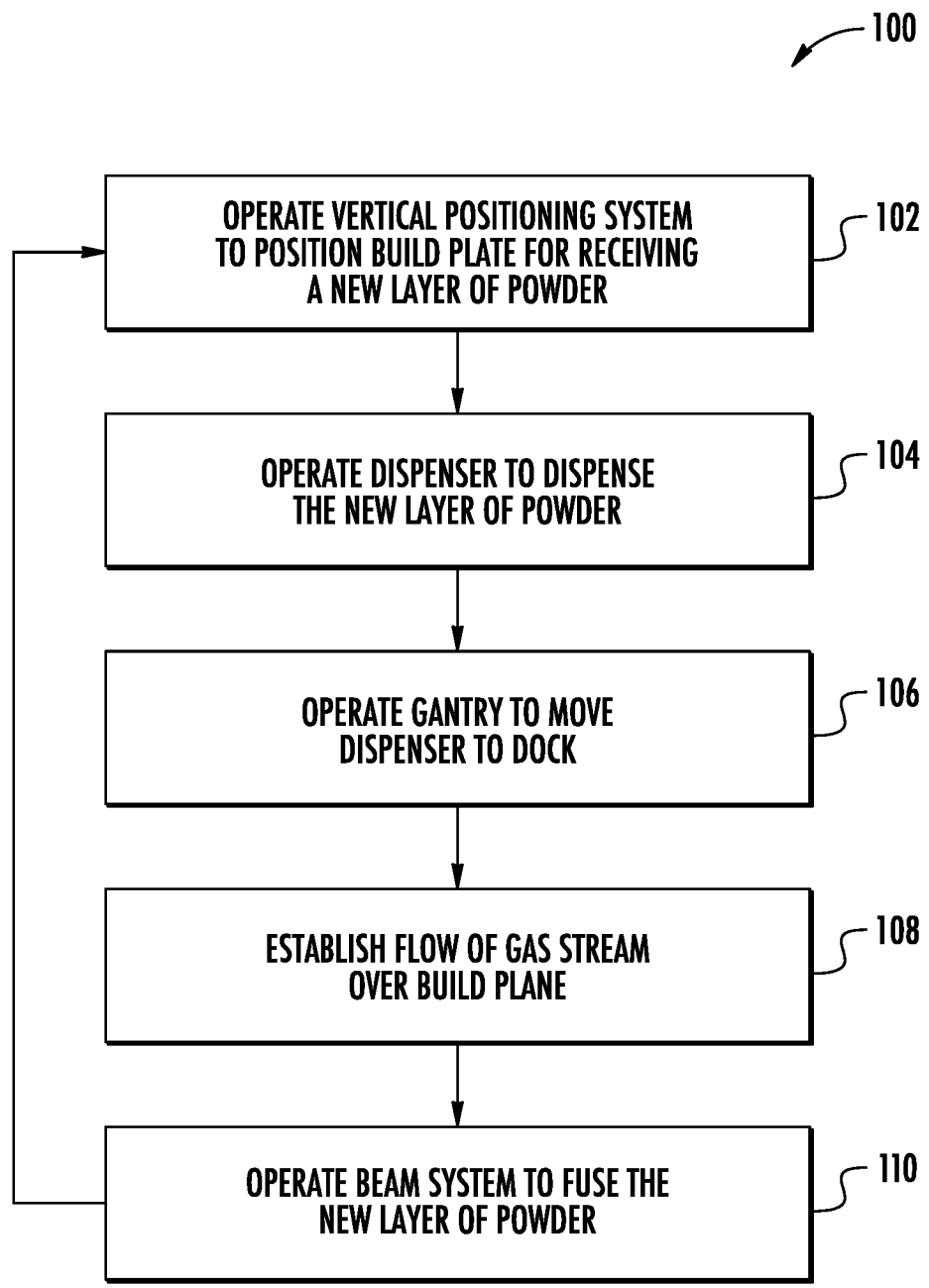
FIG. 11 is a flowchart depicting a method for operating a 3D print engine.

FIG. 11 is a flowchart depicting a method 100 for operating the print engine 4 to fabricate a 3D article 3. Controller 16 is configured to perform method 100 by operating various devices of print engine 8 as discussed below.

According to 102, the vertical positioning system 26 vertically positions the build plate 22 for receiving a new layer of powder 27. The new layer of powder has an upper surface that is vertically proximate or coincident with the build plane 31.

According to 104, the dispenser 32 dispenses the new layer of powder 27 upon the upper surface 24 or 29. The new layer of powder then defines a new upper surface 29 that is generally coincident with the build plane 31.

According to 106, the gantry 64 moves the dispenser back to the dock 67. The wall portion 66 then forms a part of lateral wall 44.

According to 108, the gas handling system 14 is operated to generate a gas stream 60 which flows from gas inlet 54 to gas outlet 56. The flow director structures 98 shape the flow field of the gas flow stream to provide a more uniform velocity of gas flow velocities above the build plane 31.

According to 110, the beam system 40 is operated to selectively melt and fuse the new layer of powder 28. As indicated by the arrow, steps 102-110 are repeated until the 3D article is fabricated.

The specific embodiments and applications thereof described above are for illustrative purposes only and do not preclude modifications and variations encompassed by the scope of the following claims.

What is claimed:

1. A three-dimensional (3D) print engine for fabricating a 3D article comprising:
   a plurality of walls laterally defining a build chamber;
   a build box including a build plate coupled to a vertical positioning system, the build plate defining a lateral area;
   a powder dispenser;
   a beam system configured to generate a plurality of energy beams that scan over a build plane within the lateral area of the build plate and that is at a fixed height for powder fusion;
   a peripheral plate disposed between the build plate and the plurality of walls, the peripheral plate having an upper surface;

a gas inlet that ejects a gas flow stream at an inlet end of the build chamber and passes over the build plane and at least part of the upper surface of the peripheral plate;
a gas outlet at an outlet end of the build chamber and receives the gas flow stream from the gas inlet;
a plurality of projecting structures mounted to and extending above the upper surface of the peripheral plate, the plurality of projecting structures shaping a flow field of the gas flow stream to provide a more uniform velocity of gas flow velocities above the build plane;
the upper surface of the peripheral plate includes an outlet surface which is laterally disposed between the build plate and the gas outlet, the plurality of projecting structures including a dam wall projecting above the outlet surface and having a major axis along an axis Y that is perpendicular to a general flow direction X of the gas stream, the dam wall includes two dam walls that individually span a portion of a width of the build chamber and have a gap between them along the axis Y;
a gas handling system coupled to the gas inlet and gas outlet; and
a controller configured to:
1) operate the vertical positioning system to position the build plate for receiving a new layer of powder;
2) operate the powder dispenser to dispense the new layer of powder over the build plate or a previously dispensed layer of powder, the new layer of powder having an upper surface proximate to the build plane;
3) operate the gas handling system to provide the gas flow stream;
4) operate the beam system to selectively fuse the new layer of powder; and
5) repeat steps 1-4 to complete fabrication of the 3D article.

2. The 3D print engine of claim 1 wherein the lateral area of the build plate is at least 0.5 square meter.

3. The 3D print engine of claim 1 wherein the lateral area of the build plate is at least 0.7 square meter.

4. The 3D print engine of claim 1 wherein the peripheral plate laterally surrounds the build plane.

5. The 3D print engine of claim 1 wherein the upper surface of the peripheral plate is parallel to the build plane.

6. The 3D print engine of claim 1 wherein the upper surface of the peripheral plate is coplanar to the build plane.

7. The 3D print engine of claim 1 wherein the gas inlet includes a lower row of nozzles that eject gas at a first inlet velocity and an upper row of nozzles that eject gas at a second inlet velocity, the second inlet velocity being higher than the first inlet velocity to entrain a flow stream from the lower row of nozzles across the build plane.

8. The 3D print engine of claim 1 wherein the upper surface of the peripheral plate includes an inlet surface that is laterally disposed between the build plate and the gas inlet, the plurality of projecting structures including an array of fins extending above the inlet surface and individually having a vertical profile as viewed along a general flow direction X that is one of a triangle, a rectangle, a polygon, and a curve.

9. The 3D print engine of claim 8 wherein the upper surface of the peripheral plate includes two middle surfaces that are between the lateral walls and the build plane and overlap the build plane with respect to the general flow direction X, the plurality of projecting structures including an array of fins extending above the middle surfaces and individually having a vertical profile as viewed along the general flow direction X that is one of a triangle, a rectangle, a polygon, and a curve.

10. The 3D print engine of claim 1 wherein the plurality of projecting structures include a plurality of pairs of vertical fins individually having two fins that define opposing acute angles with respect to a general flow direction X of the gas stream.

11. The 3D print engine of claim 1 wherein the plurality of projecting structures include a plurality of fins individually having a vertical minor axis and a lateral axis defining an acute angle with respect to a general flow direction X of the gas stream.

12. The 3D print engine of claim 1 wherein the plurality of projecting structures include a plurality of triangular fins, the triangular fins including a lower edge at the upper surface of the peripheral plate, a leading edge, and a trailing edge, wherein a leeward edge is the shortest edge.

13. The 3D print engine of claim 1 wherein the upper surface of the peripheral plate includes an inlet surface that is laterally disposed between the build plate and the gas inlet, the plurality of projecting structures including a first vertical diverter wall projecting above the inlet surface and having a major axis defining an oblique angle with respect to a general flow direction X of the gas stream.

14. The 3D print engine of claim 13 wherein the plurality of projecting structures includes a second vertical diverter wall projecting above the inlet surface and having a major axis that is aligned with the general flow direction X of the gas stream.

15. The 3D print engine of claim 1 wherein the dam walls have unequal lengths along Y so that the gap is not centered with respect to Y.

16. The 3D print engine of claim 1 wherein the powder dispenser includes a wall portion that forms a portion of the plurality of walls that laterally define the build chamber when the powder dispenser is in a docked position.

17. A method of fabricating a three dimensional (3D) article comprising:
providing a 3D print engine including:
a plurality of walls laterally defining a build chamber;
a build box including a build plate coupled to a vertical positioning apparatus, the build plate defining a lateral area;
a powder dispenser;
a beam system configured to generate a plurality of energy beams that scan over a build plane within the lateral area of the build plate and that is at a fixed height for powder fusion;
a peripheral plate disposed between the build plate and the plurality of walls, the peripheral plate having an upper surface;
a gas inlet that ejects a gas flow stream at an inlet end of the build chamber and passes over the build plane and at least part of the upper surface of the peripheral plate;
a gas outlet at an outlet end of the build chamber and receives the gas flow stream from the gas inlet;
a plurality of projecting structures mounted to and extending above the upper surface of the peripheral plate, the plurality of projecting structures shaping the flow field of the gas flow stream to provide a more uniform velocity of gas flow velocities above the build plane;
the upper surface of the peripheral plate includes an outlet surface which is laterally disposed between the build plate and the gas outlet, the plurality of projecting structures including a dam wall projecting above the outlet surface and having a major axis along an axis Y that is perpendicular to a general flow direction X of the gas stream, the dam wall includes two dam walls that individually span a portion of a width of the build chamber and have a gap between them along the axis Y; and a gas handling system coupled to the gas inlet and gas outlet;

operating the vertical positioning system to position the build plate for receiving a new layer of powder;

operating the powder dispenser to dispense the new layer of powder over the build plate or a previously dispensed layer of powder, the new layer of powder having an upper surface proximate to the build plane;

operating the gas handling system to emit the gas flow stream from the gas inlet;

shaping the gas flow stream with the plurality of projecting structures to shape the flow field of the gas flow stream to provide a more uniform velocity of gas flow velocities above the build plane;

operating the beam system to selectively fuse the new layer of powder; and repeating operation of the vertical positioning system, the powder dispenser, the gas handling system, and the beam system to complete fabrication of the 3D article.

18. The method of claim 17 wherein emitting the gas flow stream at the gas inlet includes emitting a lower gas stream from a lower array of nozzles at a first velocity V1 and entraining the lower gas stream by emitting an upper gas stream from an upper array of nozzles at a second velocity V2 that is greater than the first velocity V1.

* * * * *